US006187234B1

United States Patent
Bonomo et al.

(10) Patent No.: US 6,187,234 B1
(45) Date of Patent: Feb. 13, 2001

(54) METHOD FOR STEAM PRESSING COMPOSITE BOARD HAVING AT LEAST ONE FINISHED SURFACE

(75) Inventors: Brian Bonomo, Chicago; Pete Walsh, St. Charles; Kelly Seifert, Sugar Grove; Alex Vergara, St. Charles; Michelle Merrell, Naperville, all of IL (US)

(73) Assignee: Masonite Corporation, Chicago, IL (US)

( * ) Notice: Under 35 U.S.C. 154(b), the term of this patent shall be extended for 0 days.

(21) Appl. No.: 09/103,100

(22) Filed: Jun. 23, 1998

(51) Int. Cl.[7] .................................................. B27N 3/18
(52) U.S. Cl. ........................ 264/83; 264/102; 264/109
(58) Field of Search ................................ 264/109, 101, 264/102, 83

(56) References Cited

U.S. PATENT DOCUMENTS

| | | |
|---|---|---|
| 3,602,134 | 8/1971 | Carlsson . |
| 3,649,396 | 3/1972 | Carlsson ............................ 156/62.2 |
| 3,785,279 | 1/1974 | Fails . |
| 3,891,738 | 6/1975 | Sherr ................................... 264/101 |
| 4,162,877 | 7/1979 | Nyberg ................................. 425/84 |
| 4,393,019 | 7/1983 | Geimer .................................. 264/83 |
| 4,605,467 | 8/1986 | Bottger ................................ 156/497 |
| 4,684,489 | 8/1987 | Walter ................................. 264/101 |
| 4,850,849 | 7/1989 | Hsu et al. ............................ 425/407 |
| 5,078,938 | 1/1992 | Munk .................................... 264/109 |
| 5,158,012 | 10/1992 | Gawlitta et al. . |
| 5,195,428 | 3/1993 | Gawlitta et al. . |
| 5,217,665 | 6/1993 | Lim et al. .............................. 264/83 |
| 5,246,652 | 9/1993 | Hsu et al. ............................ 264/109 |
| 5,433,905 | 7/1995 | Tisch ..................................... 264/83 |
| 5,629,083 | 5/1997 | Teodorczyk ....................... 428/308.8 |

OTHER PUBLICATIONS

W. Ernest Hsu, A Practical Steam Pressing Technology For Wood Composites, Proceedings of the Washington State University/International Particleboard/Composite Materials Series Symposium; Publ by Washington State Univ., Pullman, WA, USA, pp. 69–82, Apr. 10–11, 1991.

W. Ernest Hsu, Comparison of Fiberboards Bonded with PF and UF Resins (conference abstract) S5.05–01, Wood Based Composites, http://www.metla.fi/conf/iufro95abs/d5pap62.htm, Oct. 8, 1995.

Primary Examiner—Mary Lynn Theisen
(74) Attorney, Agent, or Firm—Darby & Darby

(57) ABSTRACT

In a method for making composite wood products having a market ready finished side, a mat is formed of wood fibers treated with a binder. The mat is loaded into a press cavity formed between two press platens. The first press platen is a conventional hot press platen free of ports. The conventional platen can be smooth or patterned to emboss one surface of the finished product. The other press platen is a steam injection platen which has steam injection ports. The press cavity is sealed and the mat is fully consolidated. A first quantity of steam is injected through the steam injection ports into the mat at a sufficient pressure and for a sufficient time to raise the temperature of at least a portion of a thickness of the mat to 100° C. The injected steam is allowed to vent from the mat through the steam injection ports, carrying with it trapped air and moisture. A second quantity of steam is injected from the steam injection ports into the mat at a sufficient pressure and for a sufficient time to cure the binder. The second quantity of steam is vented from mat through the steam injection ports before the press cavity is unsealed.

29 Claims, No Drawings

METHOD FOR STEAM PRESSING COMPOSITE BOARD HAVING AT LEAST ONE FINISHED SURFACE

FIELD OF THE INVENTION

The present invention relates generally to methods for making a composite board, such as, particleboard, fiberboard, chip board or the like, and more particularly to a method for making composite board having at least one finished surface, e.g. embossed, smooth or patterned. The board is made from a mat composed of wood particles, chips and/or fibers and a curable or hardenable binder, for example, a resin.

BACKGROUND OF THE INVENTION

Composite wood products, such as board may be formed by consolidating a loose mat of lignocellulosic materials under heat and pressure, until the materials adhere together to form a solid wood-like product. The lignocellulosic materials may take the form of wood materials, such as, particles, chips, fibers and/or the like and it will be understood that these terms are used interchangeably herein. Although it is possible to bind lignocellulosic materials under suitable heat and consolidation conditions without additional treatments, typically, the materials forming the mat are treated with a binder, such as a resin, before heat and consolidation are applied, to enhance adherence of the materials and improve the resulting properties of the finished product.

Consolidation of the mat is generally conducted in a press. A conventional press for consolidating a binder treated wood composite mat to a particular molded shape, such as, for example, a board, includes two opposing press platens spaced to define a mold cavity. Typically, at least one platen is heated through conduction, such as through the use of electric heating coils or by passing a heated fluid or gas medium, such as steam, through conduits located in the platen body. Upon contact with the mat, heat is transferred from the platen to the mat by conduction. The press platens used in a conventional press, i.e., conventional press platens, generally have a surface for contacting the mat which is free of openings or ports. Such openings in the contact surface of a platen would cause imperfections in the surface of a finished product. Thus, conventional platens are suitable for pressing boards having a "finished" surface, e.g., a surface which does not require further mechanical working or machining in post-press operations such as sanding or planing to arrive at a market ready surface. Because post-press finishing operations such as sanding or planing are not necessary for boards produced in a conventional press, the conventional press platen may be adapted to provide a smooth "finished" surface, or an embossed or patterned "finished" surface. Subsequent to removal from the press, the board may be sold as is, or the "finished" surface of the board may be treated with a protective and/or decorative coating, such as paint or stain, to yield an enhanced market ready product.

Presses using conventional press platens have several drawbacks. Presses using conventional press platens may be unsuitable for curing certain high temperature curing resins because heat transfer from a conventional platen to the inside of a mat may be slow, thus causing temperature differentials across the thickness of the mat that are unsuitable for proper curing. For example, materials near the surface of the mat may be exposed to excessive heat, causing resin to cure too quickly and composite materials to burn, thus negatively effecting such properties as appearance and bond strength. Conversely, the inside of the mat may be exposed to insufficient heat, such that the composite material does not sufficiently consolidate and the resin does not fully cure, thus weakening the internal board strength. For the foregoing reasons, i.e., heating differentials across the thickness of a mat during consolidation and/or curing resulting in negative effects on board properties, conventional press platens are unsuitable for curing relatively thick board products.

Also, although conventional presses have been successful in making fiberboard products using only conduction heat (hot pressing), today's manufacturing demands require faster cycle times on the press and the use of stronger high-temperature resins to produce highly detailed, higher density, and, at times, thicker fiberboard products. It is known that the disadvantages of conventional platens can be overcome by supplying, or injecting, steam directly into a mat through modified press platens provided with steam injection ports for that purpose. This is generally known as "steam injection" pressing. The steam passes from the injection ports into interstitial spaces between the wood particles, chips and/or fibers forming the mat, thus carrying heat quickly and uniformly to the inside of the mat. Steam injection pressing has several advantages. Steam injection pressing speeds the curing of typically dimensioned boards using conventional resins, thus significantly shortening press cycles. Steam injection pressing also permits the use of high temperature curing resins, which are not typically suitable for use in conventional pressing, and which may be cheaper, safer and/or result in a stronger bonded product. And steam injection permits consolidation and curing of relatively thick composite boards, which either do not properly cure in a conventional press or do not cure quickly enough to provide a cost competitive product. Thus, steam injection is known to speed curing of composite product, improve product quality and shorten production time for wood composite products, particularly products having thick dimensions.

The benefits and advantages of steam injection can be significantly enhanced by conducting the injection in a sealed press, i.e., a press that isolates the press cavity from the surrounding atmosphere. This can be accomplished by sealing the perimeter of the cavity. Alternatively, the entire press can be isolated in a sealed chamber. A sealed press significantly reduces or eliminates the loss of valuable steam and facilitates the injection of steam into the mat at elevated temperatures.

Steam injection pressing is generally considered unsuitable for producing a "finished" surface on board products because, as noted above, ports in a press platen typically cause imperfections in the surface of the molded product. Surface imperfections must be machined or mechanically removed, by, for example, sanding or planing, in post-pressing manufacturing steps, thus adding to the cost and complexity of manufacture. In addition to steam injection ports, steam injection platens may have channels in the mat contact surface to direct the flow of injected steam to various parts of the mat.

In a process referred to herein as "single-sided" steam injection, a mat is pressed between a single steam injection platen (a platen having steam injection ports) and a conventional platen free of steam injection ports. Steam injected through the single steam injection platen speeds curing of the mat and shortens press cycles. The conventional platen in a single sided steam injection process avoids undesirable imperfections in one surface of the molded product that would typically result from the steam injection ports of a steam injection platen. However, in single-sided steam injection, intersticial air in the uncured mat is pushed by a steam front moving from the steam injection platen towards the conventional platen free of steam injection ports. Simultaneously, a second steam front from moisture converted to steam by the conduction heat of the conventional platen may push trapped air towards the steam injection platen. Thus, the air is trapped in the core of the mat, generally closer to the conventional platen than the steam injection platen because the steam is injected under pressure. The air is unable to vent or escape through the conventional platen, which has no ports, and is trapped between the injection steam front and the conventional platen, or between the injection steam front and the second steam front. If the process is conducted in a sealed press, the problem is compounded by the inability of the trapped air to escape through the edges of the mat. The trapped air blocks steam from contacting and fully curing binder. Furthermore, the trapped air may cause "blowouts" and other imperfections in the finished product. The resulting board has inferior physical properties.

U.S. Pat. No. 4,162,877, issued to D. W. Nyberg discloses a steam-injection pressing system which includes two opposing press platens defining a molding cavity into which a fibrous mat is positioned and pressed to a desired shape. Only a lower platen is a steam distribution and injection platen which includes conduits supplying injection ports to provide fluid communication between the molding cavity and both an external source of steam and a venting system, separated by controlling valves. The upper platen includes no injection or venting ports or nozzles.

In operation of the system of U.S. Pat. No. 4,162,877, after a fibrous mat is positioned within the molding cavity, steam from the steam supply is introduced through the conduits and ports of the lower platen and injected into the pressed fibrous mat located within the molding cavity. After a selected period of time, the control valves are operated to close off the supply of steam and thereafter to open the molding cavity to the venting system. The venting system uses the conduits and injection ports of the distribution and injection platen to draw steam and moisture from the molding cavity.

Since the opposing (upper) platen of U.S. Pat. No. 4,162,877 is "clean", it may be used as an embossing platen to impress detail into the pressed fibrous mat, but only if the mat has a density less than 0.7. At any higher mat density, according to the patent, a mesh must be used to help prevent air from becoming trapped adjacent to the upper platen. Unfortunately, for many embossing-press applications, the density of the fibrous mat is greater than 0.7 and any use of a wire mesh, as taught by U.S. Pat. No. 4,162,877 would preclude the use of an embossing surface plate in the opposing platen.

It is known that trapped air can be removed or vented from a mat by "flushing" steam through the mat. Steam injected into a mat is passed through the thickness of the mat and exhausted from the mat such that it pushes or carries trapped air out of the mat. Air can be "flushed", for example, through the edges of the mat. However, flushing steam out through the edges of the mat is inefficient in the production of some dimensional lumber due to the relatively small edge area relative to a large surface area of a mat in contact with press platens. Flushing steam through the edges is also not suitable in sealed press applications or in high density mats in which flow is restricted. Alternatively, steam can be injected into the mat from one injection press platen and exhausted through an opposite press platen provided with ports to establish a "cross-flow" of steam across the thickness of the mat. U.S. Pat. No. 4,684,489 for a process for making composite wood panel calls for compression without steam injection to a first compression position, subsequent steam pressing with intermittent "flushing" of steam from one injection platen to an opposite injection platen, final compression with steam injection from both platens and a vacuum step. Although this existing "cross flow" press design allows steam to heat all areas of the mat evenly and effectively, it precludes the use of an embossing platen wherein one surface of the cavity remains "clean", free of any injection nozzles, meshes, grooves, or openings, i.e., so that high detail may be embossed on the surface of the compressed mat. This process is therefore not suitable for the production of board having at least one "finished" surface.

A journal publication to Ernest W. Hsu titled *A Practical Steam Pressing Technology for Wood Composites,* Proceedings of the Washington State University International Particleboard/Composite Materials Symposium, Pullman, Wash. Apr. 10, 1991 (hereinafter "Hsu 1991"), generally discloses that steam injection is suitable for making thick board products. On page 79 of the reference, Hsu recites the following example of a suitable steaming cycle: close press, low-pressure steam injection (11 psi for 30 seconds), steam exhaust, low-pressure steam injection, high-pressure steam injection, steam exhaust and open press. Hsu also teaches that "if injection is delayed, the mat for a high density panel may become too compressed for effective steam penetration, particularly if steam pressure is low." However, Hsu does not teach a press cycle suitable for producing a strong, thick board with at least one finished surface.

Thus, there is a need for a single-sided steam injection process that can produce a thick board with suitable strength and consistency and with at least one finished surface.

SUMMARY OF THE INVENTION

The present invention is directed to a method for making composite wood products in a steam press in which the mat is fully consolidated before any steam is injected. Full consolidation is followed by low pressure steam injection and venting sufficient to purge air from the mat, and then high pressure steam is injected to cure the resin.

The method is preferably practiced in a "single-sided" steam injection press, i.e., a press having a steam injection platen opposite a plain or patterned conventional platen. The method has the following steaming steps:

full consolidation of the mat;

low pressure steam injection (25–75 psi, 50 psi preferred; 30–120 sec, 90 sec preferred) followed by venting through the steam injection ports of the of steam injection platen sufficient to remove trapped air from the mat; and high pressure steam injection sufficient to cure the binder (100–250 psi, 200 psi preferred; 30–120 sec, 90 sec preferred).

The method makes it possible to uniformly cure densified fiber mats treated with binder utilizing one steam distribution platen and one conventional platen. Thus, the process makes practical the embossing of a finished surface on the side of the board pressed by the conventional platen.

Another embodiment would have the following steps: injecting low pressure steam from a first platen to a first portion of a thickness of a mat, the steam application sufficient to raise the temperature of the first portion of the thickness of the mat to 100° C. or greater, venting the first platen, convecting heat from a second platen to a second portion of the thickness of the mat, the heat sufficient to eliminate interstitial air from the mat, and injecting high pressure steam from the first platen to cure mat.

DETAILED DESCRIPTION

In accordance with the present method, preferably, wood fiber is prepared by conventional methods for forming a mat. Also by conventional methods, the wood fiber is treated and formed into a mat such that the content by weight of the resulting sealed pressed board is as follows: wood fiber having 5–15% moisture content; 4–8% phenolic resin binder; 1–4% wax; and 0.5–1.0% zinc borate. It will be understood that the content by weight is essentially the same before and after pressing based on the total dry weight of the board. The moisture content of the mat before pressing is approximately 7–12% and the moisture content of the pressed board product is about 4–8%. The wax provides water repellent properties to the sealed pressed product. The zinc borate acts as a fungicide, and the aluminum chloride enhances the machinability of the sealed press product. Other known additives or treatments may be provided to the wood fibers as desired. As noted above, the method will also work well with a mat made from other lignocellulosic materials such as, for example, wood chips or particles.

The preferred binder is a phenolic resin that is slow curing and has an alkalinity less than 2.5% and a pH less than 10. The boiling water gel time of the preferred resin should be greater than 20 minutes and preferably in the range of 20–60 minutes. (The boiling water gel time is determined by a standard resin test used to establish relative cure rates of various resin types or various resin formulations by measuring the resin cure rate at 212° F.) The binder is added to the wood fibers, and the mixture is formed into a fibrous mat which is fully compressed between the platens of the press. After the mat is fully compressed, heat in the form of steam is applied in a first injection to purge air and in a second injection throughout the mat to cure the resin. Other binders such as, for example, thermosetting resins such as urea-formaldehyde, phenol-formaldehyde, resorcinol-formaldehyde, condensed furfuryl alcohol resins or organic polyioscyanates, are suitable for use in the process. The binder adheres the wood fibers together to give a compressed fibrous mat structural integrity and hold it in the desired molded shape.

It was previously thought that single-sided steam injection could not be conducted on a highly densified mat, particularly a mat having a thick cross-sectional dimension, due to problems associated with steam penetration, trapped air and resin blowout. Consolidation was thought to prevent effective steam penetration. Increasing the pressure of the injected steam to facilitate steam penetration leads to a steam front moving from the steam injection platen towards the conventional platen which is known to trap air. The trapped air cannot escape through the conventional platen and reaches a pressure equal to that of the injected steam. The trapped air blocks steam from contacting binder in portions of the mat, thus preventing curing of those mat portions. Furthermore, when the molding cavity is opened, the sudden release of pressure build-up in the trapped air in the consolidated and cured product can cause defects, e.g., blemishes or imperfections in the finished product. Furthermore, high pressure steam injection is thought to cause resin blowout, i.e., the undesired removal of resin from wood particles or fibers by the force of steam injection, usually in portions of the mat closest to the injection ports. Resin blowout leads to defects in the finished product.

It has been discovered that the present method solves the problem of trapped air while avoiding resin blowout. Low pressure steam injection followed by venting purges trapped air from the mat. Resin blowout is prevented by fully consolidating the mat and keeping the press closed before any steam injection is applied. Resin blowout is further prevented by thoroughly venting pressure from the consolidated mat, preferably through the steam injection ports, prior to opening the press cavity to release the finished product. The prevention of resin blowout and elimination of trapped air permits the application of high pressure steam which thoroughly penetrates the mat to cure the binder. High pressure steam in turn permits the rapid curing of binders having a slow curing time and/or high curing temperature, such as, for example phenolic resins. Phenolic resins applied in smaller quantities provide cured properties comparable to other known resins, and thus are more economical to use. Phenolic resins are safer than currently preferred MDI resins. Thus, the resulting finished board exhibits improved board properties and is produced in a cheaper, safer manner in a press time comparable to conventional methods.

After the mat has been treated and formed, it is loaded into the press. A single-sided steam press that may be used to compress the mat and binder to a particular molded shape includes two platens with opposing surfaces that respectively define the top and bottom of a molding cavity. The press has a conventional hot press platen with a "clean" pressing surface free of injection or venting ports. The "clean" pressing surface of the conventional platen faces a ported pressing surface of a steam injection platen. A stop frame is attached along the perimeter of the conventional platen. The edges of the molding cavity are thus defined by the stop frame. When the press is closed, an O-ring seals the stop frame to the perimeter of the steam injection platen to form a sealed molding cavity/steaming chamber. The stop frame may serve several functions including, establishing the platen-to-platen thickness of the mold cavity, minimizing loss of steam at the mat edges, and otherwise stabilizing the mat during pressing.

The conventional platen, because it has a surface free of ports, is suitable for pressing a "finished" surface onto one side of the consolidated mat. As noted above, the finished surface of the consolidated board may be smooth, or may be embossed with a highly detailed pattern transferred from the conventional platen pressing surface. The steam injection platen has a plurality of steam injection ports in the pressing surface which are supplied by steam distribution conduits in the body of the platen. The plurality of steam injection ports and the conduits provide fluid communication between the molding cavity and both an external source of steam and a venting system, separated by controlling valves. The platen is thus adapted, by manipulating the controlling valves, to inject steam into the mat through the steam injection ports, and vent steam, excess moisture and air from the mat through the same steam injection ports. Alternatively, steam injection ports connected to a steam supply, and venting ports connected to a venting system may be provided in the pressing surface of the steam injection platen, so that the injection and venting operations are isolated from each other and can be controlled separately. In this alternative arrangement, the only communication between the steam supply system and the venting system is through the mat in the press cavity.

During the steam injection process, each platen must be capable of being heated, for example, by electric heating coils or by passing steam through appropriate conduits located in the platen body, to a temperature greater than or equal to the temperature of the injected steam. By maintaining the temperature of the platens at or above that of the injected steam, condensation of the injected steam inside the mat is avoided and excess moisture in the mat is converted to steam.

With the mat loaded and positioned between the press platens, the press is closed and the mat is fully consolidated by moving at least one of the two press platens toward the other of the press platens to a final consolidation position. The thickness of the fully consolidated mat is substantially the same thickness as the thickness of the final product. For example, a siding board product may have a thickness of approximately one half inch, while a trim board product may have a thickness of 1 inch or greater. The fully consolidated mat, i.e., the composite board, has a density in the range of 0.65 to 0.85 grams/cubic centimeter. The preferred density of the consolidated mat is 0.80 for half inch board and 0.70 for one inch board.

After the mat is fully consolidated, a first steam injection is applied to the mat at a low pressure in a sufficient quantity and for a sufficient amount of time to raise to at least 100° C. the temperature of the thickness of the mat that the steam is able to penetrate, i.e., the thickness of the mat that does not have interstitial trapped air. In the present context, "low pressure" is contemplated to be less than 100 psi. For the product content-by-weight proposed above, steam at a temperature of approximately 250–300° F. was injected at 50 psi for 90 seconds to raise the temperature of substantially all of the thickness of the mat to 212° F. (100° C.). However, with the preferred material, i.e., wood fiber, variables such as, for example, thickness and density of the mat, the resin used, etc., will influence the first steam injection cycle which may be in a pressure range of from 25–75 psi for a period of 30–120 seconds. It will be understood that other combinations of lignocellulosic materials and resins are contemplated that will require a suitable steam injection pressure less than 100 psi applied for a suitable length of time to penetrate those portions of the mat that do not have trapped air.

When the temperature of a sufficient portion of the mat has reached 212° F. (100° C.), the low pressure steam injection is stopped. By manipulating the control valves for the steam injection and venting systems, the steam injection ports in the pressing surface of the steam injection platen are switched to a steam venting function, and opened to near atmospheric pressure. The low pressure steam build-up contained in the mat exhausts through the ports, carrying with it excess moisture and air. Additionally, the temperature of the conventional platen is at least equal to or higher than the temperature of the injected steam. Thus, heat conducted to the mat from the conventional platen converts excess moisture in the mat to steam which also forces air out through the venting injection ports. The steam injection ports are maintained at near atmospheric pressure until the mat is purged of air. After the air trapped in the mat has been purged, the ports are switched from the venting function to the steam injection function.

A second steam injection is applied to the mat at a pressure sufficient to cure the binder and solidify the mat. The second steam injection is preferably at high pressure. In the present context, "high pressure" is 100 psi or greater. For the product content-by-weight described above, steam at a temperature of approximately 330–400° F. was injected at 200 psi for 90 seconds, but may be injected in a range of from 100 to 250 psi for 30 to 120 seconds. When sufficient high pressure steam has been injected to attain the desired degree of cure of the binder, steam injection is halted.

The platen ports are again switched to the venting function, and pressure in the mat is exhausted before the press cavity is opened. After sufficient venting to prevent defects in the product, the press cavity is opened. The molded, cured fiberboard product is removed.

Sample half inch thick boards were prepared in a conventional press by known methods, and in a sealed press by the method of the present invention. A comparison of the properties is summarized in Table 1 below. The American Hardboard Association standards are listed in the right hand column of the table.

TABLE 1

|  | Sealed pressing | Conventional pressing | American Hardboard Association |
|---|---|---|---|
| one hour boil swell | <15% | <30% | none |
| 24 hour water absorption | <10% | <10% | <12 |
| 24 hour caliper swell | <5% | <5% | <8 |
| specific gravity (g/cc) | 80 | 90 |  |
| press time (minutes | 3 | 6 |  |
| humidification required | no | yes |  |
| not resistance | yes | no |  |
| MOR psi | 5000 | 5000 | >1800 |
| MOE psi | 250 | 250 |  |

The "one hour boil swell" is a test used by the inventors to determine the relative durability of a composite board product by calculating the percentage of change in the thickness of the board after submerging a 1 inch by 12 inch sample of the board in boiling water for one hour. After removal from the boiling water, the thickness of the board sample is measured and compared to the thickness of the board sample prior to boiling. The difference between the measurements is used to calculate a percentage of change.

The results of the comparative data in Table 1 demonstrate that sealed pressed product samples made according to the present invention exhibited significantly improved (lower) boil swell and rot resistance, lower specific gravity (density), the reduction or elimination of post press humidification, and significantly shorter press time.

The reduction or elimination of post-press humidification is an important advantage of the present invention over conventional pressing. Fluctuations in the moisture content of a composite board product after manufacture are known to cause undesirable dimensional changes, such as, for example, linear expansion or buckling of the product. During typical end use exposures, products pick up and lose moisture based on environmental factors, such as, for example, humidity, rain, drought, etc. To avoid undesirable dimensional changes in an end use exposure, typically, composite board products are humidified after conventional methods of pressing to increase the average moisture content of the product to a level suitable for a particular geographic or climatic area in order to minimize moisture content fluctuation. Post-press humidification adds moisture content to composite board products. Post-press humidification is particularly important for products produced in conventional hot platen pressing, which have substantially all of the moisture "cooked out" during pressing, and thus exit the press with nearly 0% moisture.

The ideal moisture content of composite wood products should typically be 7% (with a range of 2%) in environmentally dry areas and 12% or more in environmentally wet areas. As noted above, boards produced according to the present invention have a moisture content of 4–8%. Thus, boards produced according to the present invention are particularly suitable for interior or exterior applications in a variety of climates with little or no post-press humidification. Applications contemplated for the board products include, but are not limited to, trimboard, fencing, siding, decking, window and door components, case good substrate for the furniture industry, pallets and containers, interior molding and millwork, ornamental products such as gazebos, shutters, and wall paneling and wall systems. It will be understood that numerous other applications, though not specifically mentioned, are also contemplated.

Although preferred embodiments of the invention have been disclosed for illustrative purposes, those skilled in the art will appreciate that many additions, modifications and substitutions are possible without departing from the scope and spirit of the invention as defined by the accompanying claims.

What is claimed is:

1. A method for making a composite wood product, comprising the steps of:

forming a mat comprising wood particles treated with an uncured slow-curing phenol formaldehyde binder, the binder having an alkalinity less than 2.5% and a pH less than 10;

placing said mat in a press cavity defined between first and second press platens;

closing the press cavity;

consolidating the mat fully by moving at least one of the first and second press platens toward the other of the first and second press platens to a final compression position;

supplying a first quantity of steam to the mat through at least one steam port in the first press platen, said first quantity of steam supplied at a pressure in the range of 25 to 75 psi and for a period of time in the range of 30 to 120 seconds;

venting said first quantity of steam from the mat through said at least one steam port in said first press platen such that excess air is purged from the mat;

supplying a second quantity of steam to the mat through the at least one steam port in the first press platen, the second quantity of steam supplied at a pressure in the range of 100 to 250 psi and at a temperature sufficient to cure the binder;

venting excess pressure from the mat before opening the press cavity; and opening the press cavity.

2. A method for making a composite wood product, comprising the steps of:

forming a mat comprising wood particles treated with uncured binder;

placing said mat in a press cavity defined between first and second press platens;

closing the press cavity;

consolidating the mat fully by moving at least one of the first and second press platens toward the other of the first and second press platens to a final compression position;

supplying a first quantity of steam to the mat through at least one steam port in the first press platen and venting said first quantity of steam from the mat through said at least one steam port in said first press platen, said first quantity of steam supplied at a pressure and for a period of time and vented such that excess air is purged from the mat; and supplying a second quantity of steam to the mat through the at least one steam port in the first press platen, the second quantity of steam supplied at a temperature and pressure sufficient to cure the binder.

3. The method of making a composite wood product according to claim 2 further comprising the steps of:

venting excess pressure from the mat before opening the press cavity; and opening the press cavity.

4. The method of making a composite wood product according to claim 2 wherein the first quantity of steam is supplied at a low pressure.

5. The method of making a composite wood product according to claim 2 wherein the first quantity of steam is supplied at a pressure less than 100 psi.

6. The method of making a composite wood product according to claim 5 wherein the first quantity of steam is supplied in a range of from 25 to 75 psi.

7. The method of making a composite wood product according to claim 2 wherein the first quantity of steam is supplied for a period of from 30 to 120 seconds.

8. The method of making a composite wood product according to claim 5 wherein the first quantity of steam is supplied for a period of from 30 to 120 seconds.

9. The method of making a composite wood product according to claim 6 wherein the first quantity of steam is supplied for a period of from 30 to 120 seconds.

10. The method of making a composite wood product according to claim 2 wherein the second quantity of steam is supplied at a pressure higher than a pressure of the first quantity of steam.

11. The method of making a composite wood product according to claim 2 wherein the second quantity of steam is supplied at a pressure equal to or greater than 100 psi.

12. The method of making a composite wood product according to claim 11 wherein the second quantity of steam is supplied at a pressure in a range of from 100 to 250 psi.

13. The method of making a composite wood product according to claim 2 wherein the second quantity of steam is supplied for a period of from 30 to 120 seconds.

14. The method of making a composite wood product according to claim 11 wherein the second quantity of steam is supplied for a period of from 30 to 120 seconds.

15. The method of making a composite wood product according to claim 12 wherein the second quantity of steam is supplied for a period of from 30 to 120 seconds.

16. A method for making a composite wood product, comprising the steps of:

forming a mat comprising wood particles treated with uncured binder, the mat having opposite first and second sides;

consolidating the mat to a final thickness in a sealed press cavity;

supplying a first quantity of steam through said first side of the mat to at least that portion of the thickness of the mat that is not occupied by a quantity of excess air, said first quantity of steam supplied to said portion of the thickness in a pressure and for a period of time sufficient to raise the temperature of said portion of the mat to at least 100° C.;

venting the mat through said first side such that the quantity of excess air is purged from the mat; and supplying a second quantity of steam through said first side at a temperature and pressure sufficient to cure the binder throughout the thickness of the mat.

17. The method of making a composite wood product according to claim 16 further comprising the step of:

venting excess pressure from the mat through said first side before unsealing the press cavity; and unsealing the press cavity.

18. The method of making a composite wood product according to claim 16 wherein the first quantity of steam is supplied at a pressure less than 100 psi.

19. The method of making a composite wood product according to claim 18 wherein the first quantity of steam is supplied in a range of from 25 to 75 psi.

20. The method of making a composite wood product according to claim 16 wherein the first quantity of steam is supplied for a period of from 30 to 120 seconds.

21. The method of making a composite wood product according to claim 18 wherein the first quantity of steam is supplied for a period of from 30 to 120 seconds.

22. The method of making a composite wood product according to claim 19 wherein the first quantity of steam is supplied for a period of from 30 to 120 seconds.

23. The method of making a composite wood product according to claim 16 wherein the second quantity of steam is supplied at a pressure higher than a pressure of the first quantity of steam.

24. The method of making a composite wood product according to claim 19 wherein the second quantity of steam is supplied at a pressure equal to or greater than 100 psi.

25. The method of making a composite wood product according to claim 24 wherein the second quantity of steam is supplied at a pressure in a range of from 100 to 250 psi.

26. The method of making a composite wood product according to claim 16 wherein the second quantity of steam is supplied for a period of from 30 to 120 seconds.

27. The method of making a composite wood product according to claim 24 wherein the second quantity of steam is supplied for a period of from 30 to 120 seconds.

28. The method of making a composite wood product according to claim 25 wherein the second quantity of steam is supplied for a period of from 30 to 120 seconds.

29. A method for making a composite wood product, comprising the steps of:

forming a mat comprising wood particles treated with uncured binder, the mat having opposite first and second sides, a moisture content and an air content;

consolidating the mat to a final thickness in a sealed press cavity;

supplying a first quantity of steam through said first side of the mat to a first portion of the thickness of the mat that is adjacent to the first side of the mat, said first quantity of steam supplied to said first portion of the thickness in a pressure and for a period of time sufficient to raise the temperature of said first portion of the mat to at least 100° C.;

heating a second portion of the thickness of the mat adjacent to the second side of the mat by convection, the heating sufficient to convert at least a portion of the moisture content in the second portion of the thickness of the mat to steam;

venting the mat through said first side such that excess air is purged from the mat; and supplying a second quantity of steam through said first side at a temperature and pressure sufficient to cure the binder throughout the thickness of the mat.

* * * * *

UNITED STATES PATENT AND TRADEMARK OFFICE
CERTIFICATE OF CORRECTION

PATENT NO.    : 6,187,234 B1
DATED         : February 13, 2001
INVENTOR(S)   : Brian Bonomo It is certified that error appears in the above-identified patent and that said Letters Patent is hereby corrected as shown below:

<u>Title page,</u>
Item [75], Inventor, change "Chicago" to -- Oak Park --.

Signed and Sealed this

Eighteenth Day of December, 2001

Attest:

Attesting Officer

JAMES E. ROGAN
*Director of the United States Patent and Trademark Office*